United States Patent
Singh

(10) Patent No.: US 10,423,651 B2
(45) Date of Patent: Sep. 24, 2019

(54) ANALYSIS OF MOBILE APPLICATION REVIEWS BASED ON CONTENT, REVIEWER CREDIBILITY, AND TEMPORAL AND GEOGRAPHIC CLUSTERING

(71) Applicant: CA, Inc., New York, NY (US)

(72) Inventor: Satnam Singh, Bangalore (IN)

(73) Assignee: CA, Inc., New York, NY (US)

( * ) Notice: Subject to any disclaimer, the term of this patent is extended or adjusted under 35 U.S.C. 154(b) by 725 days.

(21) Appl. No.: 14/671,082

(22) Filed: Mar. 27, 2015

(65) Prior Publication Data

US 2016/0283497 A1 Sep. 29, 2016

(51) Int. Cl.
*G06F 7/00* (2006.01)
*G06F 16/35* (2019.01)

(52) U.S. Cl.
CPC .................... *G06F 16/35* (2019.01)

(58) Field of Classification Search
CPC ....................................................... G06F 16/355
USPC ......................................................... 707/737
See application file for complete search history.

(56) References Cited

U.S. PATENT DOCUMENTS

| | | | |
|---|---|---|---|
| 7,072,846 B1 * | 7/2006 | Robinson | G06Q 30/0202 705/7.32 |
| 7,395,164 B1 * | 7/2008 | Frazier | G06F 17/18 702/79 |
| 7,558,769 B2 * | 7/2009 | Scott | G06Q 30/02 705/7.29 |
| 8,010,480 B2 * | 8/2011 | Dave | G06Q 30/0282 706/45 |
| 8,150,724 B1 * | 4/2012 | Robinson | G06Q 30/02 705/7.31 |
| 10,225,365 B1 * | 3/2019 | Hotchkies | H04L 67/327 |
| 2007/0078669 A1 * | 4/2007 | Dave | G06Q 30/02 705/347 |
| 2007/0078845 A1 * | 4/2007 | Scott | G06Q 30/02 |
| 2007/0156732 A1 * | 7/2007 | Surendran | G06Q 10/107 |
| 2008/0301112 A1 * | 12/2008 | Wu | G06Q 30/02 |
| 2012/0290910 A1 | 11/2012 | Kumar et al. | |
| 2013/0073336 A1 | 3/2013 | Heath | |
| 2013/0144862 A1 * | 6/2013 | Ruhl | G06F 17/30873 707/710 |
| 2014/0164302 A1 | 6/2014 | Di Fabbrizio et al. | |
| 2014/0188897 A1 | 7/2014 | Baker et al. | |

* cited by examiner

*Primary Examiner* — Eliyah S. Harper

(57) ABSTRACT

A method by a network node includes generating logically associated clusters of reviews submitted by users regarding an application program executed on user equipments operated by the users, generating a separate summary for each of the clusters of the reviews, and communicating the summaries to a network node.

20 Claims, 7 Drawing Sheets

ANALYSIS OF MOBILE APPLICATION REVIEWS BASED ON CONTENT, REVIEWER CREDIBILITY, AND TEMPORAL AND GEOGRAPHIC CLUSTERING

BACKGROUND

The present disclosure relates to computing systems, and, in particular, to management of applications, application servers, and user equipment.

Users download a myriad of different types of application programs (also commonly referred to as "mobile apps") to many types of user equipment having widely varying software and hardware characteristics. For example, users can select from among several million applications available on application stores for downloading to cellular telephones (e.g., "smart phones"), tablet computers, laptop computers, and other types of user equipment for processing. The volume of applications being downloaded is growing exponentially with the proliferation of capable user equipment, which include over a billion Apple IOS and Android phones used throughout the world.

Application stores allow users to review applications by providing textual opinions and numeric ratings. Ratings define the polarity (favorable, unfavorable, neutral) and strength of polarity (5 of 5 being strongly favorable or positive rating, for example, 4 of 5 being weakly unfavorable, 3 of 5 being neutral, 1 being strongly unfavorable or negative rating, for example) of opinions and may be represented by numerically or by a number of selected symbols (e.g., stars).

Mobile application reviews have a significant impact on the number of application downloads and associated monetization opportunities for application owners. Application owners are also provided valuable feedback through the reviews that can be used to improve existing features and identify desirable new features. In view of some applications have thousands or millions of users, the associated high volume and diversity of feedback from reviewers oftentimes is an overwhelming burden on application owners and application users to sift through to attempt to obtain useful insight about applications.

SUMMARY

Some embodiments disclosed herein are directed to a method by a computer that includes generating logically associated clusters of reviews submitted by users regarding an application program executed on user equipments operated by the users, generating a separate summary for each of the clusters of the reviews, and communicating the summaries to a network node.

In some further embodiments, reviews are clustered based on credibility of the reviewers, timing between application version changes and submission of reviews, timing of submission of the reviews, geographic locations of the reviewers, topics and/or concerns disclosed in the reviews, characteristics of the user equipment processing the application, and/or other defined conditions.

Some other embodiments are directed to a computer program product including a non-transitory computer readable storage medium having computer readable program code embodied in the medium that when executed by a processor of a computer system causes the computer system to perform operations. The operations include generating logically associated clusters of reviews submitted by users regarding an application program executed on user equipments operated by the users, generating a separate summary for each of the clusters of the reviews, and communicating the summaries to a network node.

Other methods, mobile application review analysis computers, network nodes, and systems according to embodiments of the invention will be or become apparent to one with skill in the art upon review of the following drawings and detailed description. It is intended that all such methods, mobile application review analysis computers, network nodes, and systems be included within this description, be within the scope of the present invention, and be protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Figure 1:
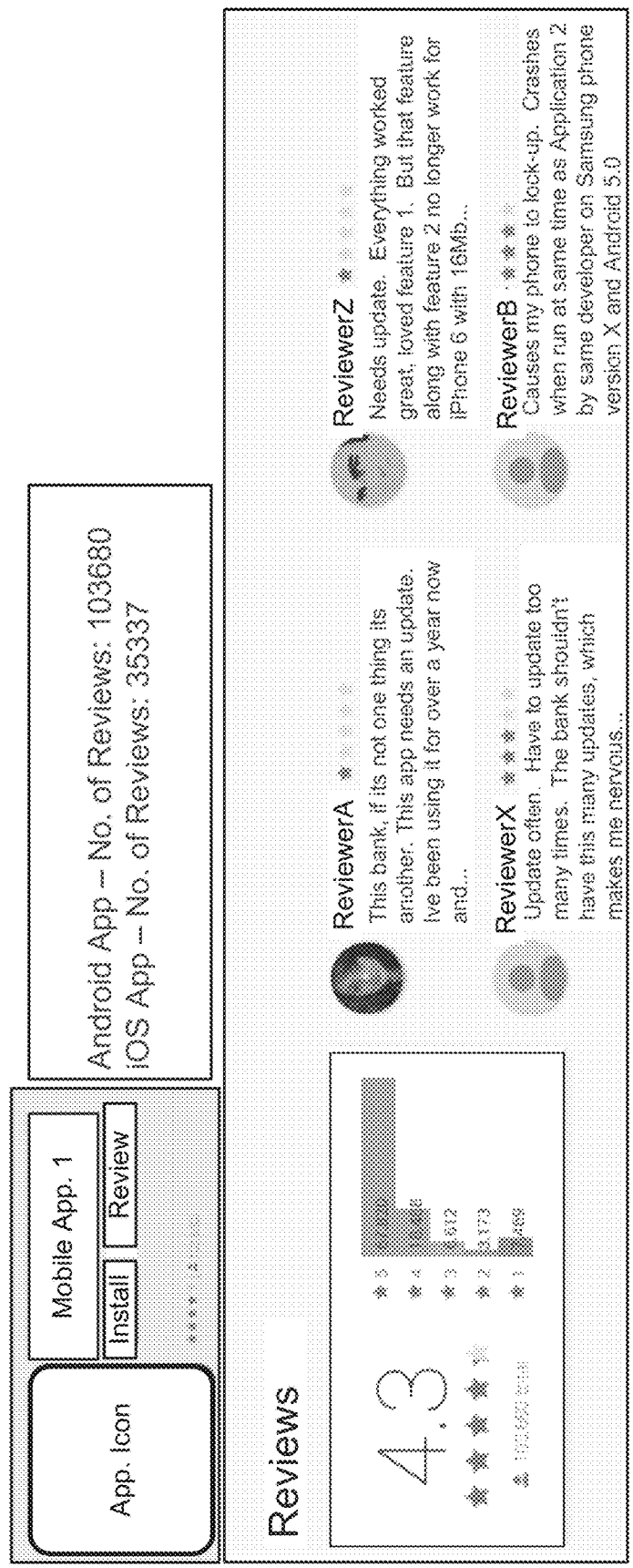
FIG. 1 illustrates a website page displaying reviews submitted by users regarding an application program executed on user equipments operated by the users and statistics for the reviews.

FIG. 1 illustrates a website page displaying reviews submitted by different identified users regarding an application program executed on user equipments operated by the users and statistics for the reviews. The reviews can be stored on an application server operated by an enterprise store 240. The displayed information states that 103,680 reviews have been submitted by users of an android application version and 35,337 reviews have been submitted by users of the Apple iOS application version. The application has an average rating of 4.3 stars out of 5 stars. Content of reviews from four different identified users are also displayed along with each of the user's selected ratings.

Mobile application reviews can have a significant impact on the number of application downloads that users perform. Enterprises, such as application owners, sometimes monitor application reviews by users. However known approaches for analyzing reviews do not provide sufficiently actionable insight into what users are observing with application operation and their opinion as to existing and desirable new application features. For example, the website of FIG. 1 displays a relative high 4.3 rating for the application, however the high rating disguises poor reviews that the application has been receiving subsequent to version upgrade which includes a feature that many users feel does not work properly on their particular equipment. Manual analysis of application reviews can be overly time-consuming and costly, particularly in view of some applications generating thousands of user reviews per day.

Figure 2:
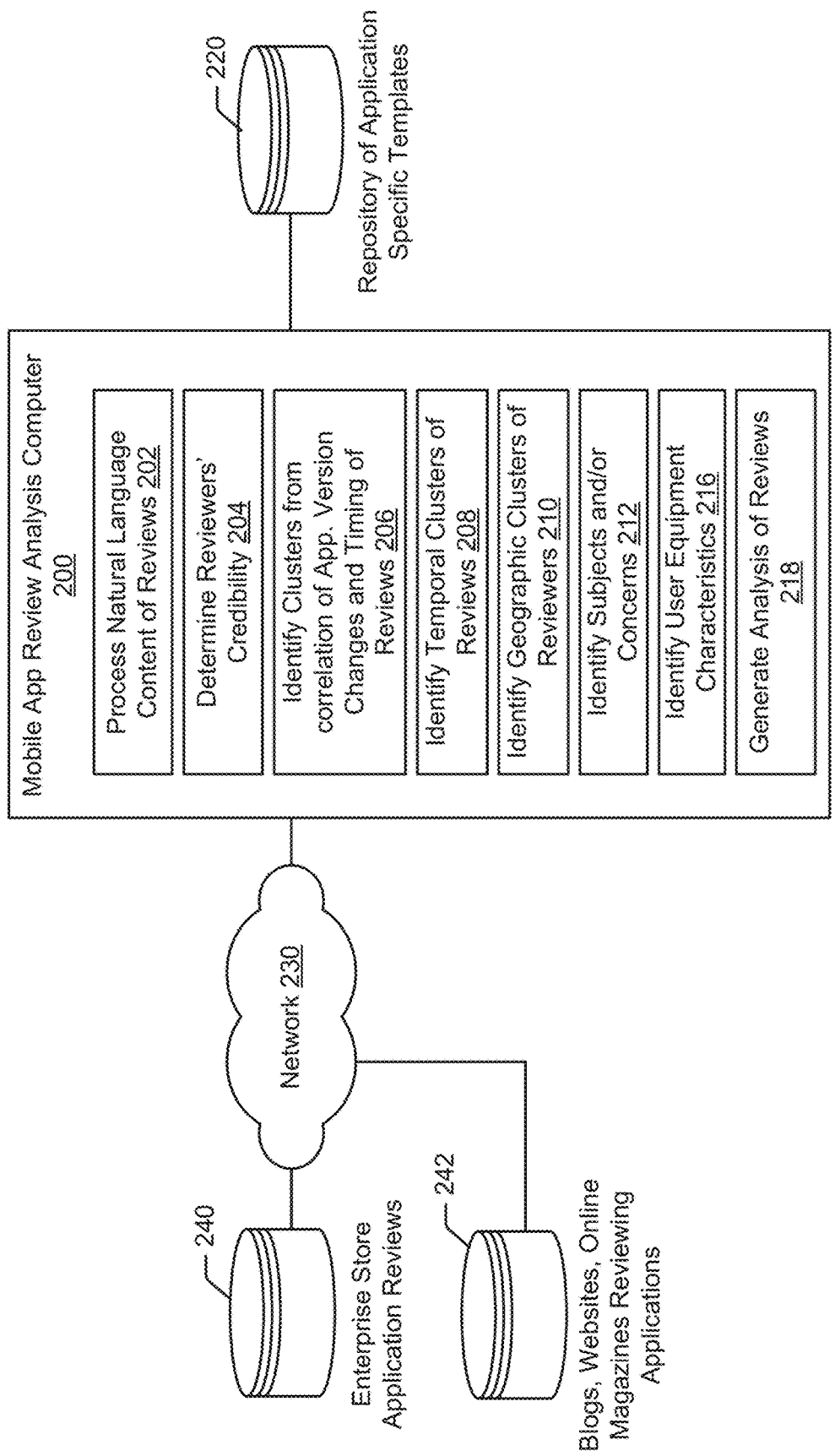
FIG. 2 is a block diagram of a computer system containing a mobile application review analysis computer that generates clusters of reviews and generates summaries for the clusters according to some embodiments.
Figure 3:
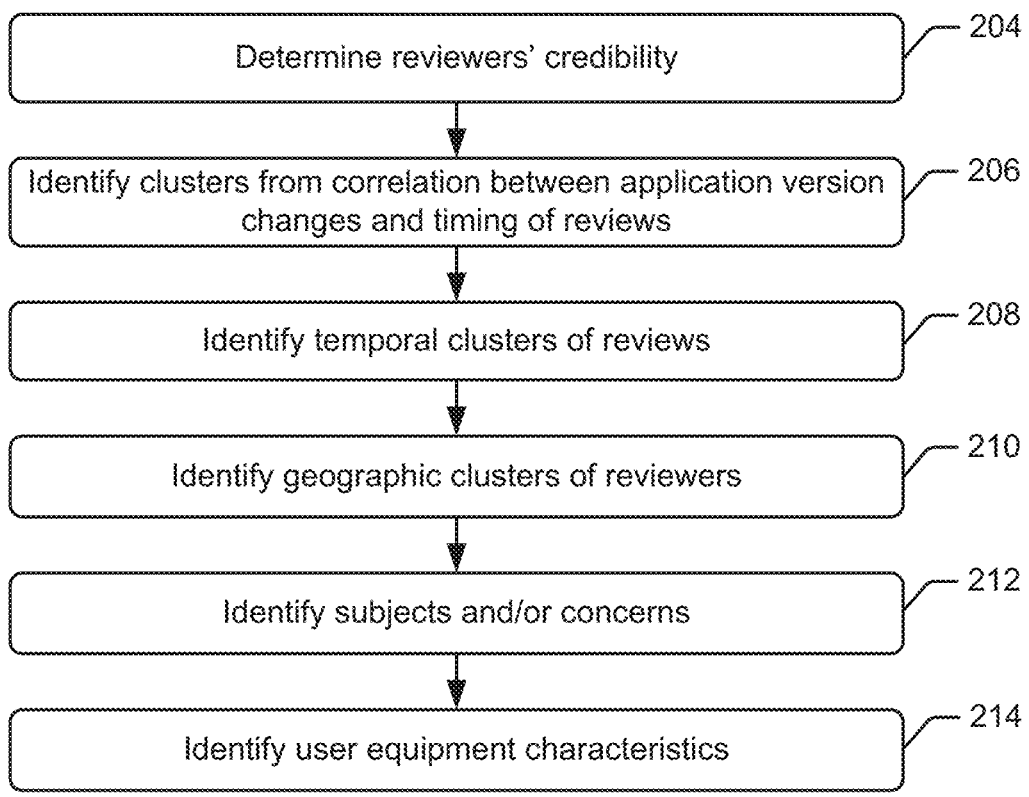
FIG. 3 is a flowchart of operations performed by a mobile application review analysis computer according to some embodiments.

FIG. 2 is a block diagram of a computer system containing a mobile application review analysis computer 200 (also referred to as "analysis computer 200" for brevity) that generates clusters of reviews and generates summaries for the clusters of reviews according to some embodiments. FIG. 3 is a flowchart of corresponding operation that may be performed by the analysis computer 200 or another component of the system. Although some embodiments are disclosed in the context of analysis of mobile application reviews, these and other embodiments can be used to analyze review of any type of application programs.

Referring to FIGS. 2 and 3, the analysis computer 200 programmatically operates to automatically extract topics and/or concepts that are related to new application feature suggestions from users, existing application feature enhancements identified by users, and/or customer complaints and complements about application features. The analysis computer 200 generates summaries of reviews that may be more easily processed by application owners and enterprises to improve the application. The analysis computer 200 may operate to automatically analyze user reviews and provide more immediate feedback for identifying software errors and requirements for enhancing existing features and incorporating new features in the application. Summaries generated by the analysis computer 200 may be used to identify the underlying cause(s) of user satisfaction and/or dissatisfaction, and/or the underlying cause(s) of changes observed in user satisfaction and/or dissatisfaction over time.

The analysis computer 200 obtains reviews that have been submitted by users regarding an application program executed on user equipments operated by the user. The user equipments can include, but are not limited to, cellular telephones (e.g., "smart phones"), tablet computers, laptop computers, desktop computers, etc. The reviews can be stored on an application server operated by the enterprise store 240 and/or another network node 242. The enterprise store 240 may be the Apple application store (e.g., iTunes), the Android application store (e.g., Google Play and/or Amazon Appstore), and/or the Window application store (e.g., Microsoft Windows Store). The network node 242 may be a blog server, website server, social media server (e.g., Twitter, Facebook, etc.), a server containing online magazines that review applications, etc. The analysis computer 200 may read or otherwise obtain the reviews from the enterprise store 240 and/or the network node 242 via a data network 230 (e.g., Internet). The analysis computer 200 may include a web crawler that searches through on-line nodes to identify reviews of defined applications.

In accordance with some embodiments, the analysis computer 200 generates logically associated clusters of reviews submitted by users regarding an application program executed on user equipments operated by the users, and generates a separate summary for each of the clusters of the reviews. The summaries are communicated to a network node, such as to the enterprise store 240, an application developer, or other network node.

A component 202 of the analysis computer 200 processes natural language content of the reviews. The natural language processing component 202 may select among a plurality of dictionaries, ontologies, or templates of keywords based on an identifier for the application. The dictionaries, ontologies, or templates may be stored in a repository 220. Different dictionaries, ontologies, or templates may contain different sets of keywords which are customized to different ones of a plurality of applications downloadable from the enterprise store 240. The component 202 outputs a listing of keywords contained in each of the reviews regarding an application, and may output a count of how many occurrences of each of various keywords contained in the reviews. The component 202 may output information identifying logical associations between the keywords (e.g., strings of identified keywords, spacing proximity between defined keywords, etc.).

Another component 204 determines the reviewer's credibility. It is known that some application developers or other entities have paid reviewers or generated automated computer programs to write "fake" reviews on application stores. These reviews mislead users and undermine the credibility of the application review process. It may therefore be advantageous to identify the credibility of the reviewer, such as by generating a credibility score that indicates whether a review appears to be machine generated, whether a review appears to be generated by someone who is not an actual user of the application (e.g., whether it appears the reviewer has a threshold level of knowledge about the application), etc.

The credibility component 204 can operate to determine the credibility of each user who has submitted an application review. The credibility component 204 can then sort the reviews among the clusters based on the credibility determined for the users who submitted the reviews. The clusters may include sub-clusters based on one or more of the sorting criteria other disclosed herein.

In some embodiments, profile data for the user is obtained from the user's application accounts with the enterprise store 240 and/or from other network nodes. In the example of FIG. 2, the credibility component 204 can obtain user profile data from blog servers, social media websites, and other network nodes 242. The information may include, the user's name, gender, phone number, email address, age, geolocation, and/or information regarding the equipment operated by the user (e.g., device manufacturer, operating system, etc.). The credibility component 204 can determine a level of similarity in the user's profile data between multiple reviews to determine whether those reviews appear to have been generated by the same user from different application accounts associated with the same user, and, if so, may generate a decreased credibility rating for those reviews.

The credibility component 204 may determine the credibility of a user by computing a level of similarity between one of the reviews by the user to any of the other reviews by identifying a level of matching between keywords contained in the one of the reviews by the user to content of the other reviews. The credibility component 204 may determine a level of similarity between textual content of multiple reviews for the same application or across a plurality of applications and/or multiple application store accounts to assess the reviewer's credibility. The component 204 generates a credibility score that indicates a reduced level of credibility based on determining a threshold level of matching between keywords contained in the one of the reviews by the user to content of a threshold number of the other reviews. Thus, when paid reviewers generate identical or substantially similar reviews of a same application or multiple different applications, the credibility component 204 may identify existence of that similarity and correspondingly provide those reviews with a reduced credibility score.

The credibility component 204 may determine the credibility of a user by identifying an IP address of a user during submission of a review, and generate a credibility score based on whether the IP address is associated with a location within a defined geographic region. For example, the component 204 may obtain the user's IP address from the enterprise store 240 or another network node, determine the geographic location associated with the IP address, and generate a credibility score based on whether the user is located in a targeted area for the application. Thus, when paid reviewers are located in a country where the application is not targeted for use, such as based on that country having a different primary language, the credibility component 204 can provide those reviews with a lower credibility score based on an assumption that those reviews have a higher likelihood of being generated by paid reviewers or by reviewers who are otherwise a lower priority of concern to the application developer or owner.

The analysis computer 200 can include a component 206 that generates clusters of reviews based on determining a threshold level of correlation between when application versions were introduced to the enterprise store 240 for download and when reviews were submitted by users. For example, the version correlation component 206 can generate logically associated clusters of reviews based on obtaining information indicating timing of different versions of the application, correlating timing of the different versions of the application to timing of the reviews, and sorting the reviews among the clusters based on the correlating. The version correlation component 206 may obtain application version information from application data provided by the enterprise store 240. Different clusters of reviews can therefore be associated with different versions of an application.

Thus, when an application version has been changed to introduce new features, the component 206 can correlate within defined time windows when new features were introduced and when resulting reviews that been received from users. Positive or negative feedback received in reviews can thereby be correlated to whether that feedback arose because of introduction of a different version of the application containing new or different features which may, for example, cause erroneous operation or conversely remedy previously occurring erroneous operation on some types of user equipment, cause application performance degradation or conversely enhance performance on some types of user equipment, or cause other favorable or unfavorable feedback from users.

The analysis computer 200 can include a component 208 that identifies temporal clusters of reviews. The temporal clustering component 208 can generate logically associated clusters of reviews by sorting the reviews among the clusters based on when the reviews were submitted to the enterprise store 240. Different clusters of reviews can contain different defined date ranges for when the reviews were submitted to the enterprise store 240, posted on a message blog or social media server, or published in an online magazine or other web accessible article.

The analysis computer 200 can include a component 210 that identifies geographic clusters of reviewers. The geographic clustering component 210 can generate logically associated clusters of reviews based on determining geographic locations of the users who submitted the reviews, and sorting the reviews among the clusters based on the geographic locations determined for the users. Thus, reviews submitted by reviewers residing in different defined geographic regions can be sorted into different clusters.

More particularly, to determine geographic locations of the users who submitted the reviews, the geographic clustering component 210 may identify an IP address of a user during submission of a review, and sort the review among the clusters based on the IP address. The component 210 may obtain the user's IP address from the enterprise store 240 or another network node, determine the geographic location associated with the IP address, and sort the review among the clusters based on the geographic location. Thus, the geographic clustering component 210 can put reviews submitted by users in the United States in a different cluster than reviews submitted by users in Mexico, and so on with other reviews being sorted based on the country, city, and/or other defined geographic regional location of the associated users who submitted the reviews. The reviews may be sorted between clusters and sub-clusters based on any defined rules or conditions.

As explained above, the analysis computer 200 can perform a keyword search among content of the reviews. A component 212 can generate the logically associated clusters of reviews by operations that include selecting a template among a set of templates based on an identifier for the application program. Each of the templates can define a set of keywords and be associated with a different identifiers for application programs. The templates can be stored in the repository 220 which may be queried using an identifier for the application to retrieve one of the templates. The component 212 identifies a level of matching between individual keywords of the template and content of one of the reviews, and sorts the review among the clusters based on the level of matching.

The keywords can relate to terms that users will use to describe problematic operation of the application program. A separate summary can be generated for each of the clusters of the reviews by generating a summary of reviews containing a threshold number of the keywords relating to terms that users will use to describe problematic operation of the application program. Thus, a summary may be generated for only reviews that contain at least the threshold number of keywords that users are expected to use when describing problematic operations. Different summaries can be generated for different topics that can be discussed by users regarding the application or different concerns of users regarding the application.

The keywords can relate to terms that users will use to describe features of the application program. A summary can be generated for reviews containing a threshold number of the keywords relating to terms that users will use to describe features of the application program. Thus, a summary may be generated for only reviews that contain at least the threshold number of keywords that users are expected to use when describing features of the application program.

The keywords can relate to terms that users will use to describe existing features of the application program and other terms that users will use to describe new features of the application program. A separate summary can be generated for each of the clusters of the reviews, by generating one summary of reviews containing a threshold number of the keywords relating to terms that users will use to describe existing features of the application program, and generating another summary of reviews containing a threshold number of the keywords relating to terms that users will use to describe new features of the application program.

The analysis computer 200 can include a component 216 that generates clusters of reviews based on characteristics of the user equipments that processed the application for which the reviews were submitted. The component 216 can identify characteristics of the user equipments that executed the application program, and sort the reviews among the clusters based on the characteristics of the user equipments. Identification of characteristics of the user equipments can be performed by matching keywords, among a set of keywords defining characteristics of different user equipment hardware and software configurations, to content of the reviews. In other words, the user equipment identifying component 216 can match keywords to content of a selected review, and can identify characteristics of the hardware and/or software of the user equipment that processed the application based on which keywords are found to match content of the review. Different user equipment can be associated with different templates (e.g., dictionaries or ontologies) of keywords. Moreover, different hardware configurations and different software configurations of user equipment to be associated with different templates of keywords.

Thus, for example, one template of keywords may be targeted to identifying iPhone 6 terminals having 64 MBtyes memory and iOS version X, another template of keywords may be targeted to identifying iPhone 6 terminals having 16 MBtyes memory and iOS version X, another template of keywords may be targeted to identifying iPhone 6 terminals having 16 MBtyes memory and iOS version Y, and so-on with other templates being targeted to identifying other combinations of defined terminal manufacturers, hardware configurations, and software configurations.

Characteristics of a user equipment that executed the application program may additionally or alternatively be determined by analyzing content of communications with the user equipment during submission of the review. For example, during setup of a communication session the enterprise store 240 may record the identifier of the user equipment, and may further detect the hardware and/or software configuration of the user equipment. Characteristics of the user equipment may be determined by identifying characteristics of a web browser hosted by the user equipment used when submitting a review to the enterprise store 240 and/or to another network node 242 (e.g., blog server, social media server, website, etc.), and/or when downloading an application from the enterprise store 240. The component 216 may obtain the user, characteristics from the enterprise store 240 and/or from another network node of the system.

Figure 4:
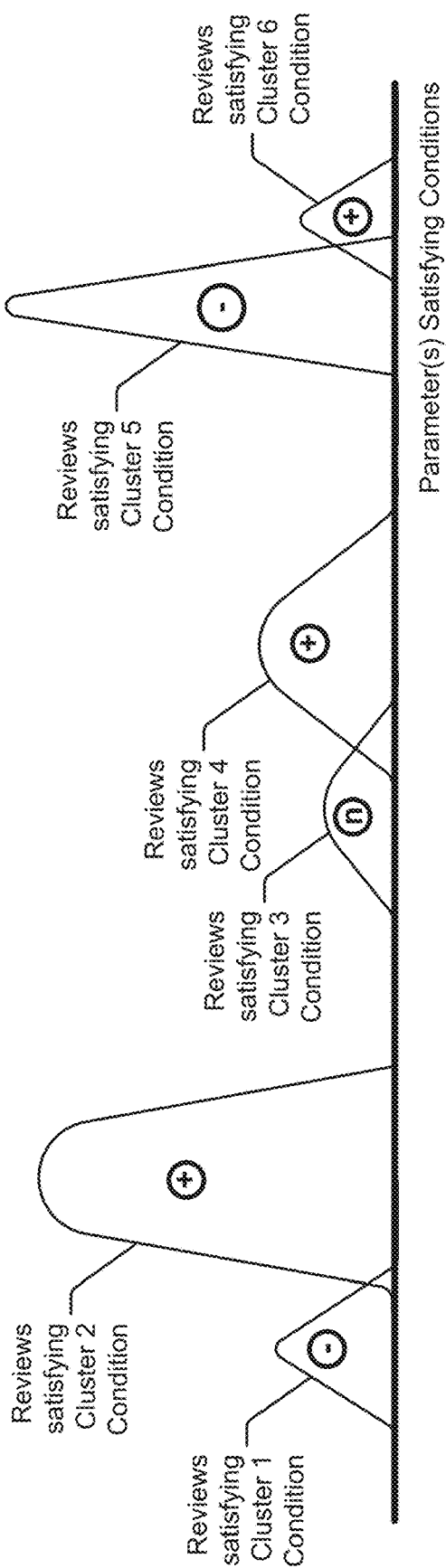
FIG. 4 illustrates clusters of reviews that are generated by a mobile application review analysis computer according to some embodiments.

FIG. 4 illustrates clusters of reviews that are generated by the analysis computer 200 according to some embodiments. Each illustrated spike of the curves represents a different cluster of reviews, and the height of each spike (Y-access) corresponds to the number of reviews within the cluster. The curves are distributed along a horizontal x-axis based on one or more parameters of the reviews which satisfy the various conditions. The parameters may include, for example, the time of receipt of the reviews, the geo-locations of the user terminals or users who generated the reviews, credibility of the users who generated the reviews, etc. Six example clusters have been illustrated in FIG. 4, with each of the six cluster containing reviews that satisfy six different conditions for being sorted to the respective cluster. The six clusters may contain different reviews, or some reviews may satisfy the conditions for being included within more than one cluster. Cluster 1 is illustrated as containing reviews that are summarized as containing negative "−" feedback regarding the application, while, in contrast, cluster 2 is illustrated as containing reviews are summarized as containing positive "+" feedback regarding the application. Cluster 3 may contain neutral "n" feedback regarding a particular feature of the application, while cluster 4 may contain feedback regarding a desired new feature for the application. Which applications are included within which clusters can be determined based on one or more of the operations disclosed herein with regard to, for example, FIGS. 2 and 3.

Figure 5:
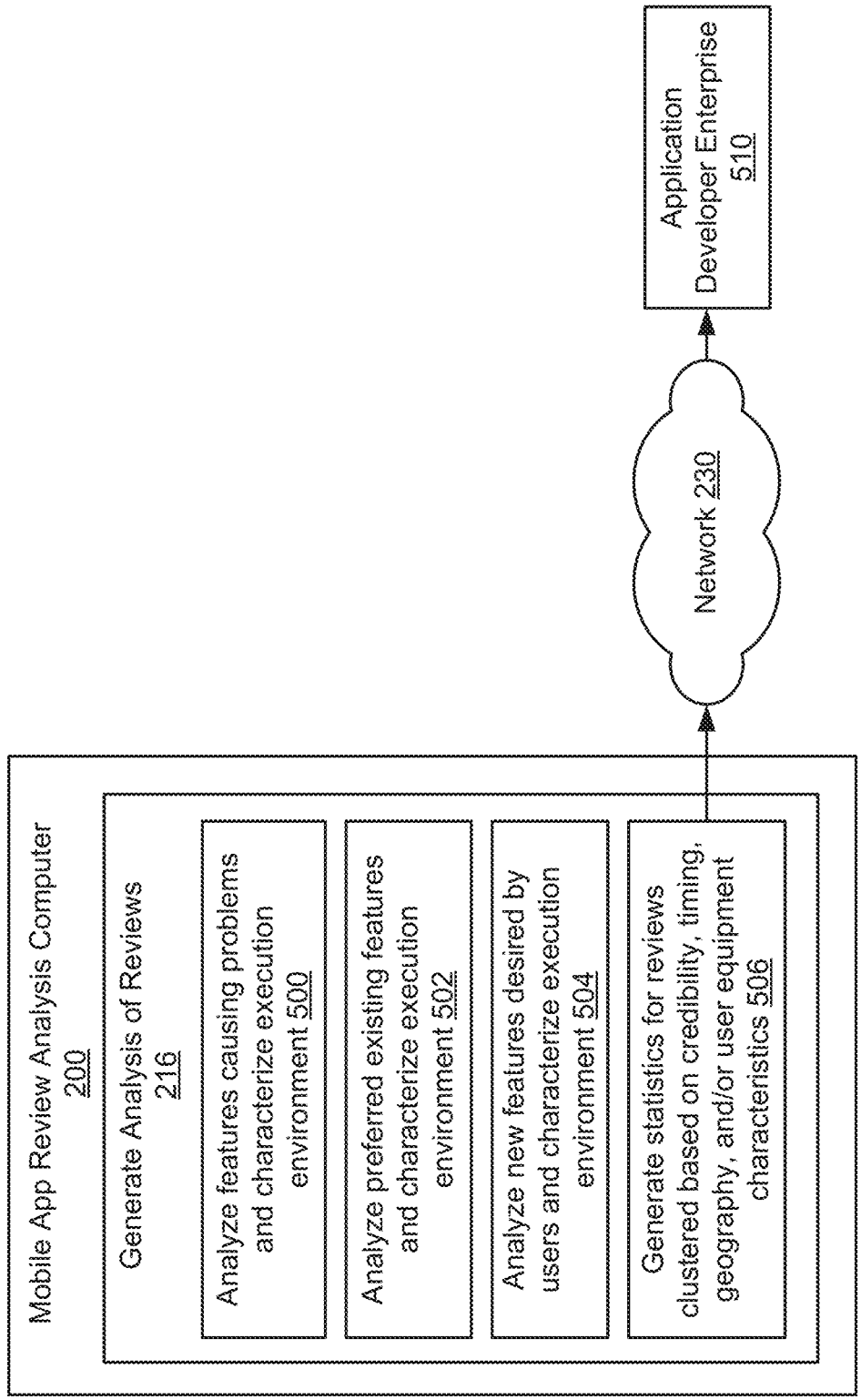
FIG. 5 is a data flow diagram for operations performed by a mobile application review analysis computer to generate summaries of clustered reviews according to some embodiments.

FIG. 5 is a data flow diagram for operations performed by the analysis computer 200 to generate summaries of clustered reviews according to some embodiments. Referring to FIG. 5, the analysis computer 200 includes a component 216 that generates statistics for reviews that been clustered based on one or more of the conditions disclosed herein. The summaries are communicated to a network node, which may be an application developer enterprise node 510, the enterprise store 240, and/or another network node of the system. The application developer enterprise node 510 may be operated by an entity that owns the application and/or a developer of the application, which may benefit from receiving summaries of the clustered reviews to enable improvement of the application by fixing problems described in the reviews, adding new features described in the reviews, initiating or changing marketing strategies for the application, etc.

In some embodiments, the network node that receives the summaries from the analysis computer 200 is configured to respond to content of the summaries satisfying a defined condition by causing the analysis computer 200 to cease downloading a particular application or application version to all user equipments, cease downloading a particular application or application version to defined types of user equipments, generate a notification to the user equipments that another version of the application should be downloaded from the enterprise store 240, and/or generated notification to the user equipments to disable operation of the application. The notification may be communicated to all user equipments, or may be selectively sent to user equipment that are identified as being configured with hardware and/or software characteristics based on one or more summaries received from the analysis computer 200.

The summary generation component 216 can identify a network address of the network node, such as the application developer enterprise 510, based on an identifier for the application program, and communicate the summaries in a message containing the network address. Because applications can be generated by many different developers and owned by many different enterprises, the summary generation component 216 can use an identifier for the application program to look up the network address for a particular developer or owner and generate a message so that is routed using the network address to the defined developer or owner.

The summary generation component 216 can include a component 500 that analyzes content of reviews within a cluster to characterize features described by the users in the reviews as causing problems with operation of the application program of the user equipment(s)) of the application program. A component 502 analyzes content of reviews within a cluster to characterize preferred existing features of the application program that are users in the reviews have described as being liked or otherwise preferred. A component 504 analyzes content of reviews within a cluster to characterize new features that the users have requested to be added to the application. A component 506 generates a summary for the reviews within a cluster based on the credibility, timing, geography, user equipment characteristics, and/or other conditions disclosed herein. The component 506 can communicate the statistics through the network 230 to the application developer enterprise 510 or another network node.

The summary may contain statistics indicating which application features are liked, disliked, or discussed in the reviews with a cluster. The summary may identify the conditions (e.g., block 204-216 of FIG. 2) that were satisfied by content of the reviews within the cluster. The summary may provide a numerical rating for those features that indicates a level of like or dislike by users. The summary may include a count or other indication of how many users liked, disliked, or otherwise discussed an application feature. The count may be combined with the numerical rating to provide weighted ratings that indicate relative consensus of the users like or dislike of an application feature. Statistics or other information generated from summaries of a cluster of reviews can be plotted or otherwise listed to allow comparison of user feedback regarding an application feature across a plurality of different versions of the application and/or execution environments (e.g., hardware and/or software configurations of the user equipments). An application developer or other enterprise may thereby more intuitively and efficiently analyze whether an application feature is perceived by users as performing acceptably across all configurations of user equipments worth there are certain configurations of user equipments where the application feature is performing acceptably. Moreover, the summaries may enable identification of whether a new feature users of only a particular configuration of the user equipments are requesting a new feature, which may be an indication of a limitation of how the user equipment operate on that particular configuration of the user equipments.

Figure 6:
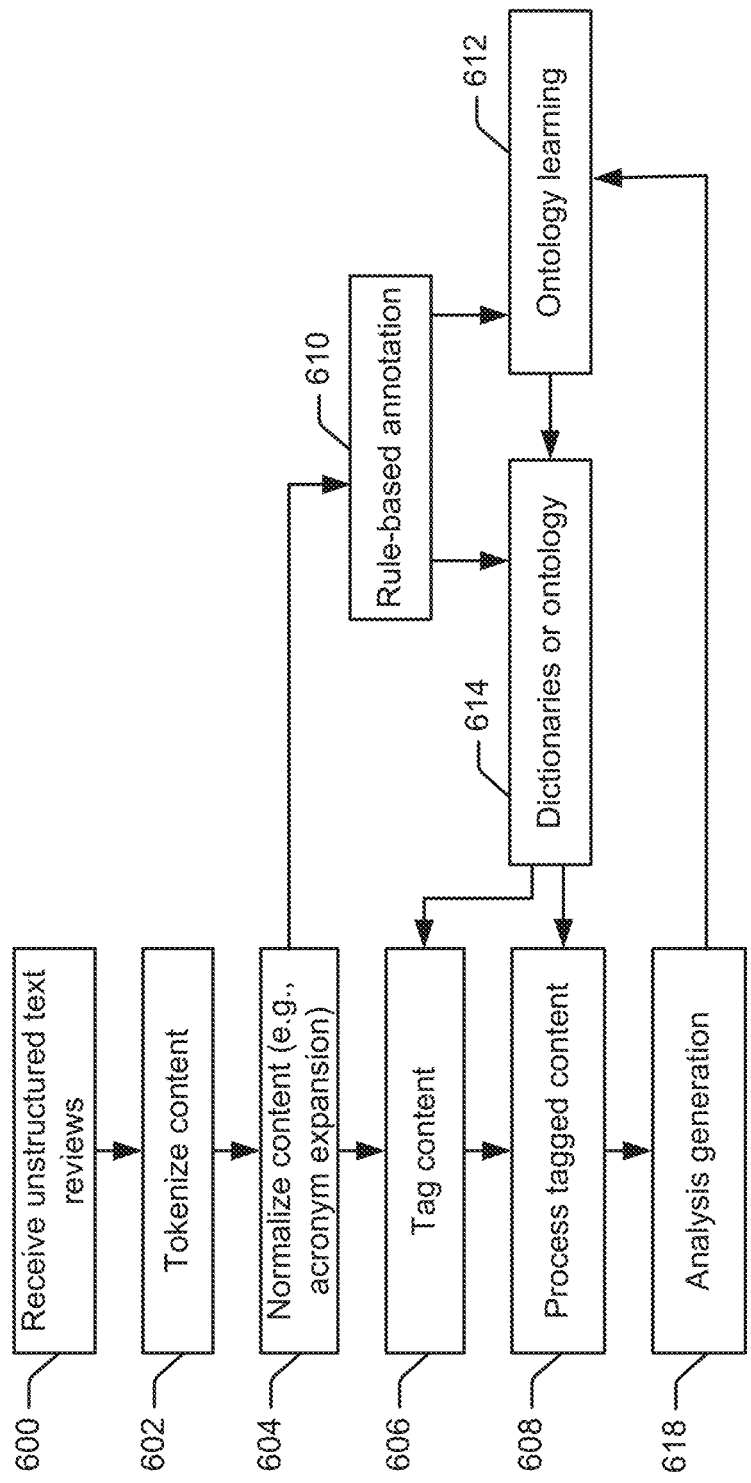
FIG. 6 is a combined flowchart and data flow diagram for operations performed by a mobile application review analysis computer to perform natural language analysis of reviews according to some embodiments.

FIG. 6 is a combined flowchart and data flow diagram for operations performed by the code 202 to perform natural language analysis of reviews according to some embodiments. Referring to FIG. 6, unstructured text is received (block 600) from reviews that have been submitted by users of an application. The unstructured text is tokenized (block 602), by parsing the text into individual words and/or strings of words according to one or more rules. Content of the tokenized text is normalized (block 604) by, for example, expanding acronyms into the associated words, correcting typographical errors, and/or discarding words there are not within a defined dictionary or template. Content of the normalized text is then tagged (block 606) by, for example, assigning numeric tags to words.

The tagged content of reviews is processed (block 608) to identify and characterize operation of the application, characteristics of the user equipments, identity of the reviewers, credibility of the reviewers, correlation of application version changes and timing of reviews, topics of the reviews, concerns disclosed in the reviews, features discussed in the reviews, and other analysis disclosed herein. Processing of the tagged content of reviews can be based on annotation rules (block 610) that identify topics, concerns, user equipment characteristics, user characteristics, etc., for one or more types of applications. Different annotation rules may be defined for different applications, so that one annotation rule may be used to process one type of application and another annotation rule may be used to process another type of application. The annotation rules may be defined based on characteristics of an application and/or keywords that users are anticipated to use to describe the application and which provide desired insight into the users' feedback.

A dictionary or ontology is obtained 614, by selecting among a plurality of defined dictionaries or ontology's based on characteristics of application, such as at identity, and applying the dictionary or ontology based on the rule-based annotation process 610. Processing (block 608) of the tagged content can include matching keywords (e.g., numerical identifiers for keywords) defined by the dictionaries or ontology 614 to the tagged content.

The analysis computer 200 may include a learning function 612 that adapts an ontology, on which the rules are defined or operate, based on content observed in the reviews and/or based on similarities or differences between rules defined for different applications. The learning function 612 may adapt over time to identify commonly used terms or phrases and their respective meaning regarding an application. Learning that is performed with regard to one application may be reused to analyze another application having similar operational characteristics and/or targeted user characteristics.

Summaries are generated (block 618) based on the processing (block 608) of the tagged content using the dictionaries or ontology 614. The summaries can be communicated to the application developer enterprise 510 or another network node as described herein.

Figure 7:
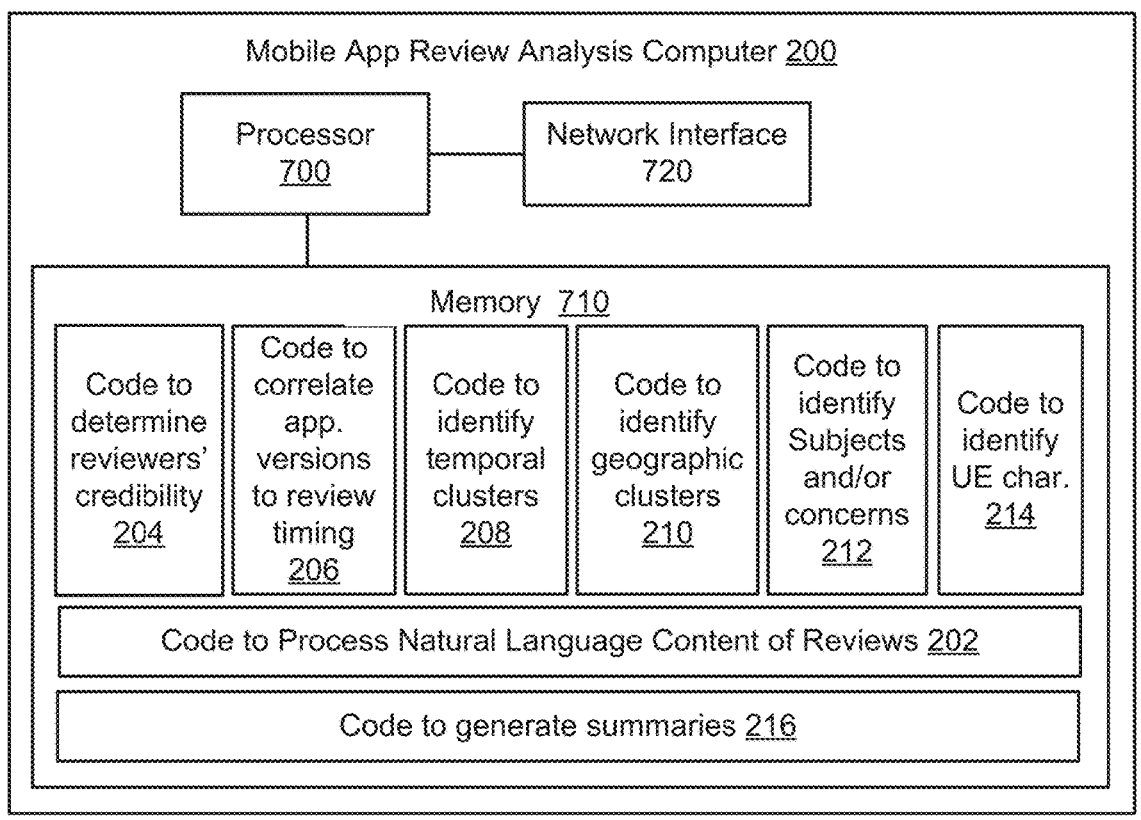
FIG. 7 is a block diagram of a mobile application review analysis computer configured according to some embodiments.

FIG. 7 is a block diagram of a mobile application review analysis computer 200 configured according to one embodiment. Referring to FIG. 7, a processor 700 may include one or more data processing circuits, such as a general purpose and/or special purpose processor (e.g., microprocessor and/or digital signal processor) that may be collocated or distributed across one or more networks. The processor 700 is configured to execute computer readable program code in a memory 710, described below as a computer readable medium, to perform some or all of the operations and methods disclosed herein for one or more of the embodiments. The memory 710 may include code 204 to determine reviewers' credibility, code 206 to correlate application versions to review timing, code 208 to identify temporal clusters, code 210 to identify geographic clusters, code 212 to identify topics and/or concerns described in the reviews, code 214 to identify user equipment characteristics, code 202 to process natural language content of reviews, and/or code 216 to generate summaries. Although a single memory block 710 has been illustrated for simplicity, it is to be understood that any number, combination of types, and hierarchy of memory storage devices (e.g., solid state memory devices, disk drives, etc.) can be used. A network interface 720 can communicatively connect the processor 700 to the enterprise store 240, other network nodes 242, repository 220, and/or the application developer enterprise 510.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit" "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
   performing operations as follows on a processor of a computer system:
   determining a plurality of reviews submitted by users regarding a particular application program executed on user equipments operated by the users;
   logically associating the plurality of reviews into a plurality of clusters of reviews, each cluster of the plurality of clusters comprising a plurality of logically associated reviews, the logically associating comprising:
   obtaining information indicating timing of different versions of the particular application program;
   correlating the timing of the different versions of the particular application program to timing of the reviews, wherein each cluster of reviews corresponds to a particular version of the particular application program; and
   sorting the reviews among the clusters based on the correlating;
   generating a separate summary for each cluster of the plurality of clusters of reviews, each summary comprising an indication of a level of user satisfaction with at least one feature of the particular application program; and
   transmitting the summaries to a network node via a network interface.

2. The method of claim 1, wherein the logically associating the plurality of reviews into the plurality of clusters of reviews comprises:
   for each of the plurality of reviews, determining credibility of the review;
   determining a credibility score for each of the plurality of reviews based on the determined credibility of the review; and
   sorting the plurality of reviews among the clusters based on the credibility scores determined for the plurality of reviews,
   wherein the separate summary for each of each clusters of reviews comprises an indication of the credibility of the reviews within the cluster.

3. The method of claim 2, wherein the determining the credibility of the review comprises:
   determining a user that authored the review; and
   computing a level of similarity between the review to another review authored by the user by identifying a level of matching between keywords contained in the review to content of the other review,
   wherein generating the credibility score indicates a reduced level of credibility based on determining a threshold level of matching between keywords contained in the one of the reviews by the user to content of a threshold number of the other reviews.

4. The method of claim 2, wherein the determining the credibility of the review comprises:
   identifying an IP address of a user during submission of the review; and
   generating the credibility score based on whether the IP address is associated with a location within a defined geographic region.

5. The method of claim 1, wherein the logically associating the plurality of reviews into a plurality of clusters of reviews comprises:
   determining geographic locations of the users who submitted the reviews; and
   sorting the reviews among the clusters based on the geographic locations determined for the users.

6. The method of claim 5, wherein the determining geographic locations of the users who submitted the reviews comprises:
   identifying an IP address of a user during submission of a review; and
   sorting the review among the clusters based on the IP address.

7. The method of claim 1, wherein the logically associating the plurality of reviews into a plurality of clusters of reviews comprises:
   sorting the reviews among the clusters based on when the reviews were submitted to a network node of the computer system.

8. The method of claim 1, wherein the logically associating the plurality of reviews into a plurality of clusters of reviews comprises:
   selecting a template among a set of templates based on an identifier for the particular application program, each of the set of templates defining a set of keywords and being associated with a different set of identifiers for a different seta application programs;
   identifying a level of matching between individual keywords of the template and content of one of the reviews; and
   sorting, the review among the clusters based on the level of matching.

9. The method of claim 8, wherein the keywords relate to terms that users will use to describe problematic operation of the particular application program; and
   wherein the generating a separate summary for each cluster of the plurality of clusters of reviews, comprises generating a summary of reviews containing a threshold number of the keywords relating to terms that users will use to describe problematic operation of the particular application program.

10. The method of claim 8, wherein the keywords relate to terms that users will use to describe features of the particular application program; and
    wherein the generating a separate summary for each cluster of the plurality of clusters of reviews comprises generating a summary of reviews containing threshold number of the keywords relating to terms that users will use to describe features of the particular application program.

11. The method of claim 8, wherein:
wherein the keywords relate to terms that users will use to describe existing features of the particular application program and other terms that users will use to describe new features of the particular application program, and
wherein the generating a separate summary for each cluster of the plurality of clusters of the reviews comprises:
generating one summary of reviews containing a threshold number of the keywords relating to terms that users will use to describe existing features of the particular application program; and
generating another summary of reviews containing a threshold number of keywords relating to terms that users will use to describe new features of the particular application program.

12. The method of claim 1, wherein the logically associating the plurality of reviews into a plurality of clusters of reviews comprises:
identifying characteristics of the user equipments that executed the particular application program; and
sorting the reviews among the clusters based on the characteristics of the user equipments.

13. The method of claim 12, wherein the identifying characteristics of the user equipments that executed the particular application program comprises:
matching keywords, among a set of keywords defining characteristics of different user equipment hardware and software configurations, to content of the reviews.

14. The method of claim 12, wherein the identifying characteristics of the user equipment that executed the particular application program comprises:
analyzing content of communications with the user equipments during submission of the reviews to identifying characteristics of the user equipments.

15. The method of claim 1, wherein the logically associating the plurality of reviews into a plurality of clusters of reviews comprises:
determining credibility of the users who submitted the reviews;
obtaining information indicating timing of different versions of the particular application program;
correlating timing of the different versions of the particular application program to timing of the reviews;
determining geographic locations of users who submitted the reviews;
determining when the reviews were submitted to a network node of the computer system;
selecting a template among a set of templates based on an identifier for the particular application program, each of the templates defining a set of keywords and being associated with a different set of identifiers for a different of application programs;
identifying level of matching between individual keywords of the template and content of the reviews;
identifying characteristics of the user equipments that executed the particular application program; and
sorting the reviews among the clusters based on the credibility of the users who submitted the reviews, the correlating between the timing of the different versions of the particular application program to the timing of the reviews, the geographic locations of the users who submitted the reviews, when the reviews were submitted to the network node of the computer system, the level of matching between individual keywords of the template and content of the reviews, and the characteristics of the user equipments that executed the particular application program.

16. The method of claim 1, wherein the transmitting the summaries to the network node comprises:
identifying a network address of the network node based on an identifier for the particular application program; and
communicating the summaries message containing the network address.

17. A non-transitory computer readable storage medium having computer readable program code embodied in the medium that when executed by a processor of a computer system causes the computer system to perform operations comprising:
determining, a plurality of reviews submitted by users regarding a particular application program executed on user equipments operated by the users;
logically the plurality of reviews into a plurality of clusters of reviews, each cluster of the plurality of clusters comprising a plurality of logically associated reviews, the logically associating comprising:
obtaining information indicating timing of different versions of the particular application program;
correlating the timing of the different versions of the particular application program to timing of the reviews; and
sorting the reviews among the clusters based on the correlating;
generating a separate summary for each cluster of the plurality of clusters of reviews, each summary comprising an indication of a level of user satisfaction with at least one feature of the particular application program; and
transmitting the summaries to a network node via a network interface.

18. Then non-transitory computer readable storage medium of claim 17, wherein the logically associating the plurality of reviews into a plurality of clusters of reviews comprises:
selecting a template among a set of templates based on an identifier for the particular application program, each of the set of templates defining identifiers for a different set of application programs;
identifying level of matching between individual keywords of the template and content of the reviews; and
sorting the reviews among the level of matching between individual keywords of the template and content of the reviews.

19. The non-transitory computer readable storage medium of claim 18, wherein the logically associating the plurality of reviews into a plurality of clusters of reviews further comprises:
determining geographic locations of the users who submitted the reviews;
identifying characteristics of the user equipments that executed the application program; and
sorting the reviews among the clusters based on the geographic locations of the users who submitted the reviews, the level of matching between individual keywords of the template and content of the reviews, and the characteristics of the user equipments that executed the particular application program.

20. The method of claim 1, further comprising:
for each of a plurality of the reviews, determining a credibility of the review;

determining a credibility score for each of the plurality of reviews based on the determined credibility of the review;

determining, for each cluster of the plurality of clusters of reviews, whether the indication of the level of user satisfaction is below a predetermined threshold level of user satisfaction;

responsive to determining that the indication of the level of user satisfaction for a particular cluster of the plurality of cluster of reviews is below the predetermined threshold level of user satisfaction, generating a command to cause the network node to disable downloading of the particular version of the particular application program corresponding to the cluster from the network node; and transmitting, as part of the transmitting the summaries to the network node, the command to the network node.

* * * * *